(12) United States Patent
Hartsell, Jr. et al.

(10) Patent No.: US 6,352,176 B1
(45) Date of Patent: Mar. 5, 2002

(54) FUEL DISPENSING SYSTEM WITH DISCHARGE RATE CONTROL

(75) Inventors: Hal C. Hartsell, Jr., Kernersville; Brent K. Price, Winston-Salem, both of NC (US)

(73) Assignee: Marconi Commerce Systems Inc., Greensboro, NC (US)

( * ) Notice: Subject to any disclaimer, the term of this patent is extended or adjusted under 35 U.S.C. 154(b) by 0 days.

(21) Appl. No.: 09/613,852

(22) Filed: Jul. 11, 2000

(51) Int. Cl.$^7$ ................................................. G10F 1/00
(52) U.S. Cl. .............................. 222/1; 222/14; 222/59; 222/63; 417/43
(58) Field of Search .............................. 222/1, 14, 16, 222/55, 59, 63, 71, 310; 137/487.5; 417/43; 700/240, 241

(56) References Cited

U.S. PATENT DOCUMENTS

| | | | | |
|---|---|---|---|---|
| 4,662,539 A | * | 5/1987 | Komukai | 222/14 |
| 4,795,314 A | * | 1/1989 | Prybella et al. | 417/43 |
| 5,868,179 A | * | 2/1999 | Hartsell, Jr. | 141/198 |
| 5,996,843 A | * | 12/1999 | Hough | 222/71 |
| 6,227,409 B1 | * | 5/2001 | Brown | 222/1 |

* cited by examiner

Primary Examiner—Kevin Shaver
Assistant Examiner—Patrick Buechner
(74) Attorney, Agent, or Firm—Withrow & Terranova PLLC

(57) ABSTRACT

A fuel dispensing system compensates for varying fuel source flow rate requirements based on fuel dispenser feedback signals. A pumping system pumps fuel from one or more fuel sources to one or more fuel dispensers through associated conduits. When actively dispensing fuel, each fuel dispenser monitors its actual fuel discharge rate and adjusts an integral flow control device to maintain a nominal fuel discharge rate. When an active fuel dispenser fails to achieve its nominal fuel discharge rate, it indicates this condition to the pumping system via its dispenser feedback signal. In response, the pumping system increases its pumping rate until the fuel dispenser achieves its nominal fuel discharge rate. Other active fuel dispensers adjust their flow control devices as needed to maintain their nominal fuel discharge rate in response to the adjusted pumping rate. If multiple active fuel dispensers fail to achieve their nominal fuel discharge rate, the pumping system adjusts its pumping rate until all active dispensers achieve their nominal fuel discharge rate. In some configurations, active fuel dispensers provide a dispenser feedback signal that is proportionate to the actual dispenser fuel discharge rate, and the pumping system proportionately controls its pumping rate.

27 Claims, 5 Drawing Sheets

FUEL DISPENSING SYSTEM WITH
DISCHARGE RATE CONTROL

BACKGROUND OF THE INVENTION

Retail gasoline transactions represent a compromise between customer convenience and environmental as well as safety concerns. From the customer's perspective, any extension of time required to complete the fuel dispensing transaction represents an inconvenience. While from the perspective of governmental regulators and other concerned groups, excessive fuel dispensing rates represent an environmental and safety hazard. There are a number of valid reasons underlying these concerns.

For example, cars sold in the United States after 1998 are required to have onboard refueling vapor recovery (ORVR) systems to minimize vaporous emissions during vehicle refueling operations. At excessive refueling flow rates, such systems are overwhelmed and fail to function effectively. Moreover, excessive fueling rates result in "spit back," wherein a portion of liquid fuel splashes out from the vehicle's fueling port as the customer "tops off" the fuel tank at the conclusion of refueling. Spilling liquid fuel poses obvious environmental and safety concerns. In response, 40 C.F.R. 80.22, issued by the Environmental Protection Agency (EPA), provides rules governing the refueling of motor vehicles. In essence, these rules limit fuel-dispensing rates to no more than 10 gallons per minute (GPM) from any fuel dispenser not exclusively dedicated to heavy-duty vehicles, boats, or airplanes.

While subject to much variation, a basic fuel dispensing system includes a fuel source (e.g., an underground storage tank), a pump in fluid communication with the underground storage tank (e.g., a submersible turbine pump), and at least one fuel dispenser connected to the pump via a network of fluid conduits. When the fuel dispenser is activated, the pump begins pumping fuel from the tank to the fuel dispenser at a given pressure. Normally, the pump is configured to deliver fuel at a pressure and flow rate that allows the fuel dispenser to dispense fuel at a desired or nominal fuel discharge rate. Typically, the fuel dispenser includes a flow sensor (e.g., flow meter) allowing it to monitor the rate of fuel dispensed from its fuel discharge outlet, and a flow control device (e.g., a control valve) allowing it to adjust the discharge rate.

Based on monitoring the flow sensor, the fuel dispenser adjusts its flow control device to maintain the nominal fuel discharge rate, such as the mandated 10 GPM limit. In a multiple fuel dispenser installation, the pump is typically sized and configured to provide fuel at a pressure adequate to ensure that the fuel dispenser having the greatest pressure drop with respect to the pump has adequate pressure and flow to deliver fuel at the nominal fuel discharge rate. Usually, the worst-case fuel dispenser is furthest from the pump/tank, and therefore experiences the greatest conduit-related pressure loss.

This basic approach has aspects of simplicity, but includes obvious drawbacks. For example, while insuring that any individually active fuel dispenser provides fuel at the nominal fuel discharge rate, it does not readily accommodate situations where multiple dispensers are simultaneously in use. One workaround to this problem is to simply size and configure the pump (or pumps) to operate by default at a pressure high enough to provide a selected number of simultaneously active fuel dispensers with adequate flow to ensure that each one provides the requisite nominal fuel discharge rate. Drawbacks to this approach include the inefficiency of operating the fuel pump(s) at a greater pressure than required for dispensing transactions that do not require the maximum pump output, and the greater pump wear incurred at higher operating pressures. Moreover, regulations limit operating pressure of the pump, so this approach has practical as well as regulatory limits.

Some fuel dispensing systems make no real provisions for the problems associated with multiple active fuel dispensers. Such installations are a source of frustration for busy customers, as the actual fuel-dispensing rate from each active fuel dispenser decreases with each newly activated fuel dispenser. During peak refueling times, such fuel dispensing systems operate so slowly that the effective number of fueling transactions per hour is significantly reduced, thereby diminishing the profitability of the fueling station. Additionally, the dissatisfaction of consumers subjected to interminable refueling times may be such that they avoid further patronage of the offending fueling station, resulting in a long-term loss of repeat business.

Constant pressure pumps stand as an alternative to the above-described systems. Constant pressure pumps use their pump outlet pressure as a control variable. Systems of this type vary pump speed such that pump outlet pressure remains essentially constant across a range of flow rates. Thus, as additional fuel dispensers are activated, the constant pressure pump responds by increasing its pumping rate in an effort to provide each active fuel dispenser with adequate flow. While representing an improvement over fixed- or single-speed pump installations, constant pressure pumps add cost and complexity to the system. Further, because pump control is based on outlet pressure sensing rather than actual dispenser discharge rates, constant pressure pumps do not guarantee that each active fuel dispenser actually achieves its nominal fuel delivery rate.

As such, there remains a need for a fuel dispensing system that operates in a manner that maintains a nominal fuel discharge rate from each fuel dispenser regardless of the number of active fuel dispensers, up to reasonable design limits. Ideally, the system would vary the pumping characteristics of the fuel pumps providing fuel to the active fuel dispensers based on monitoring the fuel discharge rate from each active fuel dispenser, thereby ensuring that each dispenser actually delivers fuel at the nominal fuel discharge rate. Further, such monitoring ideally utilizes existing dispenser hardware, thereby minimizing the incremental cost of the improved fuel dispensing system while simultaneously easing the complexity of retrofitting existing fuel dispensing systems.

SUMMARY OF THE INVENTION

The present invention provides both methods and apparatus allowing a fuel dispensing system to adjust the pumping rate of fuel supplied to one or more fuel dispensers, based on dispenser feedback signals. Each fuel dispenser includes a flow control device for controlling the flow rate and a flow sensor for measuring the actual fuel discharge rate. The dispenser adjusts its flow control device to achieve a nominal fuel discharge rate, based on monitoring the actual fuel discharge rate from its fuel discharge outlet. Additionally, the fuel dispenser provides a dispenser feedback signal that may be used by the fuel dispensing system to vary the pumping rate/pressure of fuel supplied to the fuel dispenser.

Nominally, each fuel dispenser controls its fuel discharge rate via its flow control device. However, under certain conditions, the current pumping rate from the fuel source supplying the fuel dispenser may be inadequate to allow the fuel dispenser to achieve its nominal fuel discharge rate. In this case, the fuel dispenser may use its feedback signal to indicate the low flow rate condition. In response to this indication, a pump controller comprising a portion of the fuel dispensing system may increase its pumping rate such that all active fuel dispensers operating from the affected fuel source(s) achieve their nominal fuel discharge rates.

When multiple fuel dispensers are simultaneously active, each one may experience varying degrees of low flow rate. The pumping rate is adjusted within design limits to permit the worst-case low flow rate dispenser to achieve the nominal fuel discharge rate. In concert, any active fuel dispenser that would otherwise dispense fuel at greater than the nominal fuel discharge rate because of the increased pumping rate, adjusts its flow control device to maintain the nominal fuel discharge rate. Thus, the system of the present invention provides fuel source pumping control based on actual fuel discharge rates as monitored at each active fuel dispenser. Of course pumping rate control may also include consideration of other inputs to provide more effective rate control. For example, dispenser error signals may be used to prevent pumping control based on signals from malfunctioning fuel dispensers.

In one embodiment, each fuel dispenser in the fuel dispensing system provides a discrete fuel dispenser feedback signal. During dispensing operations, an active fuel dispenser adjusts its flow control device for a given fuel source pumping rate to achieve a nominal fuel discharge rate. Whenever the fuel discharge rate falls below the nominal discharge rate and appropriate flow control device adjustments fail to remedy the low flow rate condition, the fuel dispenser asserts its fuel dispenser feedback signal.

A pump interface system receives these discrete signals and increases the fuel-pumping rate up to a maximum rate whenever at least one dispenser feedback signal is asserted. Pumping rate adjustments may be made in stepwise fashion to provide a damped control response. For example, when a dispenser feedback signal is asserted, the pumping system may increase its pumping rate by a determined amount. After an appropriate settling time, the pumping system may determine whether a fuel dispenser feedback signal is still asserted and, if so, increase its pumping rate again, and so on. In this control scenario, the pumping rate would be maintained at the rate which caused all dispenser feedback signals to be de-asserted. An alternative scheme would be to simply maintain this pumping rate until there are no active fuel dispensers, whereupon the pumping rate logic and nominal pumping rate could be reset in anticipation of the next series of fueling transactions.

Another embodiment provides feedback signals from the fuel dispensers representative of the actual flow rate of the dispenser. A controller or intelligent logic receives such feedback signals so that such controller can ascertain the flow rates of the dispensers with respect to the desired flow rate to determine best how to control the pumping rate to achieve maximum flow rate up to design limits.

Providing feedback signals from the fuel dispensers proportionate with actual fuel dispenser discharge rates allows more sophisticated pump control. Such proportionate signals may be used by the pump control system to precisely adjust the pumping rate to a level that allows all active fuel dispensers to achieve their nominal fuel discharge rate. This allows the pump control system to pump at a rate (or pressure) no greater than that required by the particulars of the current dispensing scenario. These particulars include the number of concurrently active fuel dispensers and the pressure drops associated with the fluid conduits between the remote pump(s) and the active fuel dispensers.

Thus, with proportionate dispenser feedback control, the fuel dispensing system of the present invention can tailor pumping operations over a range of fuel dispensing scenarios. For example, the pump control system may operate the pump(s) at a different rate or pressure for an active dispenser that is close to the pump(s), as compared to the operating rate or pressure for an active dispenser that is far removed from the pump(s). In this manner, the energy consumed by the fuel pumping system is minimized, as is unnecessary wear on the pumps themselves.

DETAILED DESCRIPTION OF THE INVENTION

Figure 1:
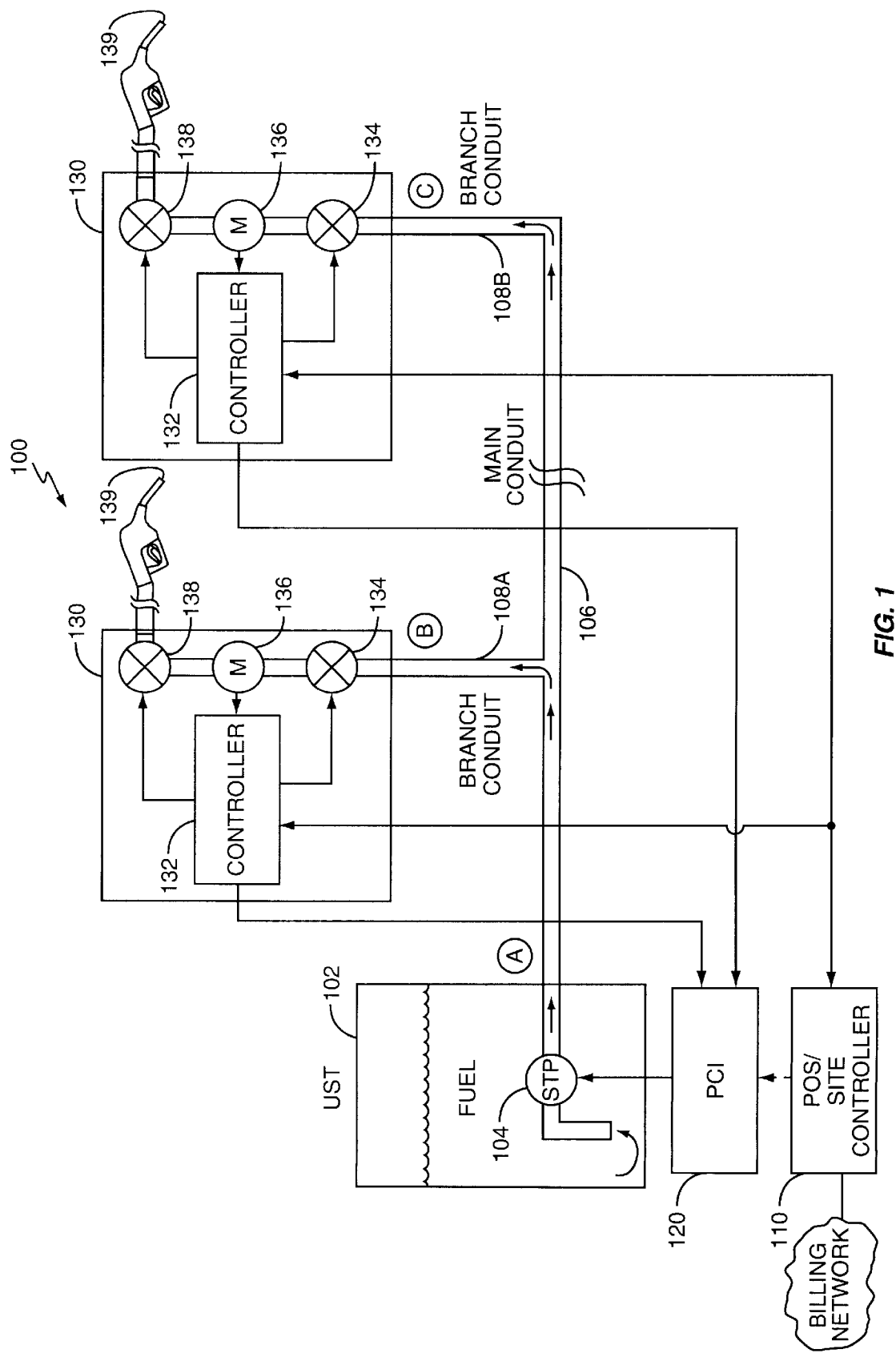
FIG. 1 is a schematic diagram of a fuel dispensing system.

FIG. 1 illustrates an exemplary fuel dispensing system 100 in which the present invention may be practiced. The fuel dispensing system 100 includes an underground storage tank (UST) 102 containing a fuel source, a pump 104, which may be a submersible turbine pump (STP), multiple fuel dispensers 130, main and branch conduits 106 and 108 respectively connecting fuel dispensers 130 with UST 102, a pump control interface (PCI) 120, and a POS/site controller 110. A more complex system might include multiple USTs 102, and multiple associated STPs 104. Further, more sophisticated fuel conduit systems would allow each fuel dispenser 130 to draw fuel from multiple fuel sources. Such a configuration would allow each fuel dispenser 130 to dispense multiple grades of fuel, or to dispense blended fuel products, which represent a precise mixture of two or more grades of fuel.

In normal operation, customers interact with fuel dispensers 130 through a customer interface (not shown). Site controller 110 determines whether to enable a given fuel dispenser 130 based on payment information input by a customer. For example, the customer may swipe a credit card in a card reader associated with the fuel dispenser 130, and this information may be relayed to site controller 110 where it is communicated to an outside billing network for authorization. Regardless, once site controller 110 determines authorization for an individual fueling transaction, it enables the appropriate fuel dispenser 130. Once activated, the fuel dispenser 130 provides PCI 120 with an enable signal. In turn, PCI 120 starts pump 104, which provides fuel from UST 102 through main conduit 106 and branch conduit 108 to the active fuel dispenser 130. Alternatively, site controller 110 may communicate directly with PCI 120 to provide the enable signal.

Each fuel dispenser 130 includes a dispenser controller 132 providing control and operating logic for fuel dispenser operations. As noted, fuel dispensers 130 may include additional operating logic associated with customer and payment interfaces, but these are not shown for clarity. A main valve 134 provides on/off flow control, as well as providing safety shut-off functions. Controller 132 sets main valve 134 to its on position for fuel dispensing operations. Fuel flowing through main valve 134 passes through flow sensor 136, which may be a flow meter providing precise flow measurement pulses to controller 132. Such flow meters are well known in the art and typically produce a known number of pulses per unit volume passed through them. Thus, the meter pulse rate is directly proportional to the fuel discharge flow rate.

By monitoring flow sensor 136, controller 132 determines the actual dispensing rate for fuel discharged from fuel discharge outlet 139. Flow control device 138 allows controller 132 to adjust the fuel discharge rate such that it is nominally equal to a desired value. Thus, flow control device 138 allows controller 132 to adjust the fuel discharge rate from a minimum value to a maximum value. Depending upon the particular flow control device 138 used, such control may be discreet (stepwise) or continuous.

As earlier noted in the discussion of conventional fuel dispensing systems, STP 104 may be configured to initially begin pumping such that the pressure at outlet A is sufficient to ensure adequate pressure at fuel delivery point B or C on the branch conduits 108A/B leading to the illustrated fuel dispensers 130. Assume that fuel dispenser 130 supplied by branch conduit 108A is the only fuel dispenser active in fuel dispensing system 100. Thus, STP 104 may be configured to develop outlet pressure A such that the pressure at fuel delivery point B on branch conduit 108A exceeds that required to ensure the desired or nominal fuel discharge rate from fuel discharge outlet 139. Generating pressure at point B in excess of that required ensuring a nominal fuel discharge rate through dispenser 130 allows for better controllability, because fuel dispenser controller 132 can use flow control device 138 to precisely regulate fuel flow rate.

Assume now that another customer activates a second fuel dispenser 130, this one supplied by branch conduit 108B. In a conventional fuel dispensing system, the outlet pressure at point A would decrease, as the available fuel flow from STP 104 split between the two active fuel dispensers 130. Customers at each fuel dispenser 130 would undesirably experience a reduced fuel discharge rate. However, in the fuel dispensing system 100 of the present invention, each fuel dispenser 130 provides a dispenser feedback signal to PCI 120. In a simple embodiment of the present invention, each fuel dispenser asserts a dispenser feedback signal when it detects a low flow rate condition via flow rate sensor 136.

The fuel dispenser 130 determines if the flow rate is under its design limits. If the fuel dispenser 130 is pumping fuel at a flow rate under its design limits because such flow rate is not being demanded by the customer, then the system should not increase the pumping rate of the STP 104. However, if the fuel dispenser 130 is pumping fuel at a flow rate under its maximum design limits and the customer is demanding more flow, the fuel dispenser 130 indicates such conditions in order to increase the pumping rate of the STP 104 as discussed below.

There are various manners in which the fuel dispenser 130 may determine if customer flow rate demanded is not being delivered yet the flow rate is under maximum design limits. One method involves the positioning of the flow control device 138 such as disclosed in U.S. Pat. No. 5,954,080 to the same assignee as the present invention discloses a gated proportional flow control valve that allows precision control at high and low flow rates. The fuel dispenser 130 controls the positioning of the flow control device 138 such that the fuel dispenser 130 knows if the flow control device 138 is fully open. If the flow control device 138 is fully open, the fuel dispenser 138 detects a demand from the customer for increased flow rate, and the current flow rate is under the maximum design limits, the fuel dispenser 130 knows that the STP 104 pumping rate must be increased to deliver increased flow rate to the customer.

Alternatively, a nozzle 139 may be employed with the fuel dispenser 130 that is electronic such that it can feedback to the fuel dispenser 130 its position. The customer uses the nozzle 139 to determine the amount of demanded flow rate. If the customer fully squeezes or opens the nozzle 139 at its maximum setting or flow rate, the fuel dispenser 130 will deliver the maximum flow rate possible under the maximum design limits. If the fuel dispenser 130 determines that the nozzle 139 is fully squeezed or open and current flow rate is under the maximum design limits, the fuel dispenser 130 knows that the STP 104 pumping rate must be increased to deliver increased flow rate to the customer.

Figure 2:
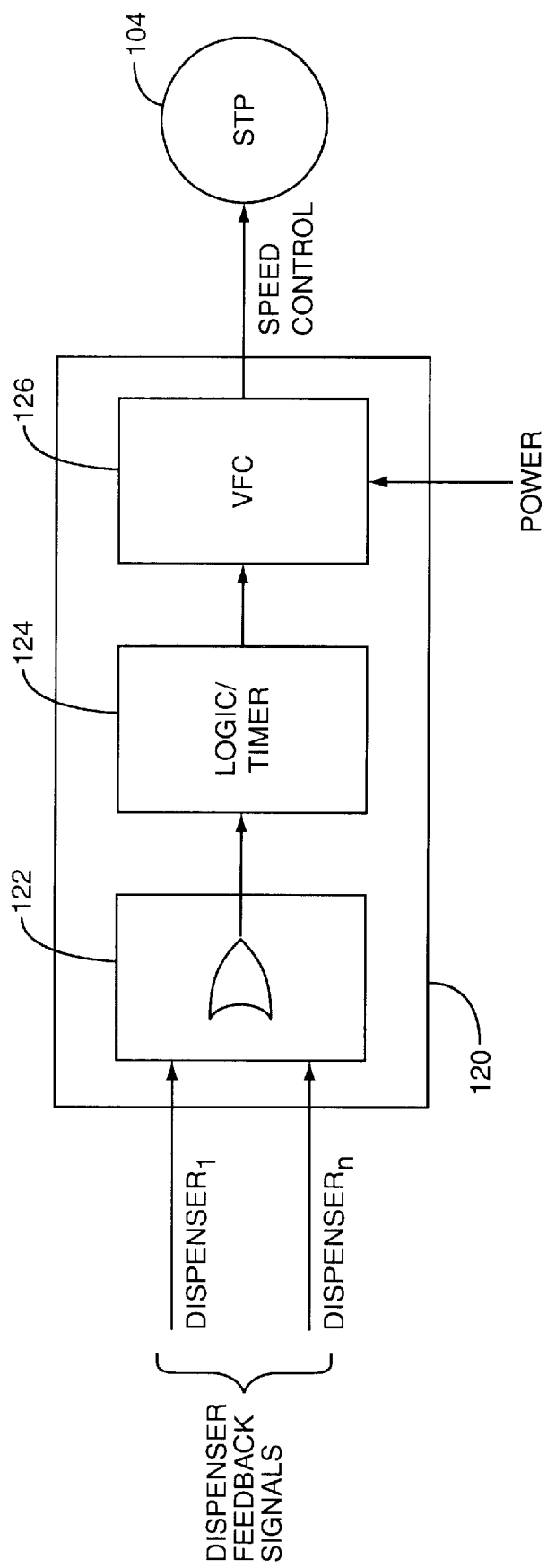
FIG. 2 is a schematic diagram of one embodiment of the pump control interface.

FIG. 2 illustrates an exemplary embodiment for PCI 120. PCI 120 receives a dispenser feedback signal from each installed fuel dispenser 130. These dispenser feedback signals may be simple high/low control indicators. For example, a high assertion on a dispenser feedback signal may be used to indicate that a given dispenser 130 is unable to dispense fuel at the nominal fuel discharge rate despite adjusting its flow control development device 138 to a maximum flow setting. A simple interface block 122 on the front-end of PCI 120 applies a logical "OR" function to the array of dispenser feedback signal inputs such that interface block 122 provides a control indicator to a logic/timer circuit 124 any time one or more dispenser feedback signal inputs are asserted. Logic/timer circuit 124 controls a variable frequency controller (VFC) 126 in response to this control indicator. As is well known, VFC 126 represents a common approach to providing variable speed control for a pump motor. VFC 126 uses a power input (which may be a three-phase input) to derive a variable frequency motor drive signal to STP 104. The frequency of the motor drive signal output from VFC 126, and hence operating speed of STP 104, is a function of the control output from logic/timer circuit 124.

Figure 3:
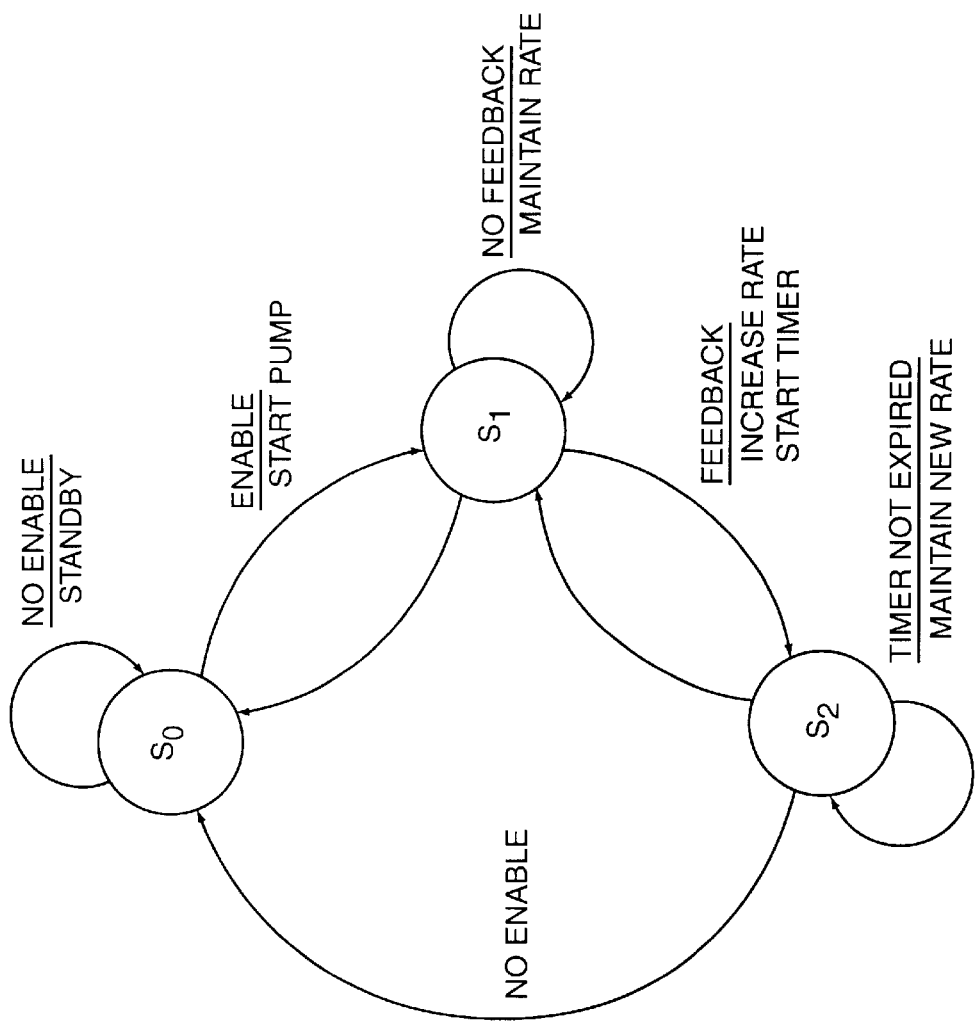
FIG. 3 is a state diagram of one embodiment of the present invention.

FIG. 3 depicts a state diagram for the PCI configuration shown in FIG. 2. Before any dispensers are activated, the PCI 120 maintains the STP 104 in an off or standby state (S0). Once PCI 120 receives an enable signal from one or more fuel dispensers 130 (or site controller 110), it starts STP 104 at a predetermined rate or speed. This default setting may be selected with specific installation considerations in mind. Once operating STP 104 (S1), PCI 120 monitors its dispenser feedback input signals. If none of the feedback signals indicate a low flow condition, PCI 120 maintains STP 104 at its initial rate (S1). However, if one or more dispenser feedback signals indicate a low flow condition, PCI 120 increases the pumping rate of STP 104 and starts a control timer. Logic/timer circuit 124 may be preprogrammed to increase the pumping rate of STP 104 by a defined amount, such as a stepwise rate adjustment, or may be designed such that an installer or system operator can configure its rate adjustment algorithm. In either case, PCI 120 uses the control timer to limit its control response frequency. Thus, after PCI 120 increases the pumping rate of STP 104, it waits a defined period of time before making further rate adjustments (S2). Once the control timer expires, PCI 120 checks to see if the low flow condition still exists for any active dispenser 130, as indicated by the dispenser feedback signals. If there is still a low flow condition, PCI 120 again increases the pumping rate of STP 104, re-starts the control timer, and the process repeats. Of course, logic/ timer circuit 124 incorporates additional processing logic such that control of STP 104 remains within acceptable design limits. In some embodiments, these may be programmable limits that are set depending upon the specific type of STPs 104 used in the specific installation.

Note that PCI 120 may include multiple interface blocks 122 for interfacing with multiple sets of fuel dispensers 130. In this case, PCI 120 may include multiple speed control outputs from VFC 126 for controlling a plurality of STPs 104. As an alternative, the fuel dispensing system 100 might include multiple PCIs 120, with each PCI 120 dedicated to controlling a single STP 104.

An alternate embodiment may provide a reduction in pumping rate adjustments during active dispensing operations, but may require additional system characterization or calibration. In this alternate approach, the PCI 120 calculates a pumping rate increase based on the particular combination of active fuel dispensers and the amount by which one or more of the active fuel dispensers 130 falls below the nominal or desired fuel discharge rate for each active fuel dispenser. Based on stored data, which may comprise look-up tables or formula constants relating to system pressure drops, etc., PCI 120 determines a pumping rate increase that will allow all active fuel dispensers to reach the nominal fuel discharge rate. Of course, even in this control scenario, PCI 120 may apply a ramping function to STP 104 via VFC 126 such that step changes are avoided in the pump motor speed control input.

Figure 4:
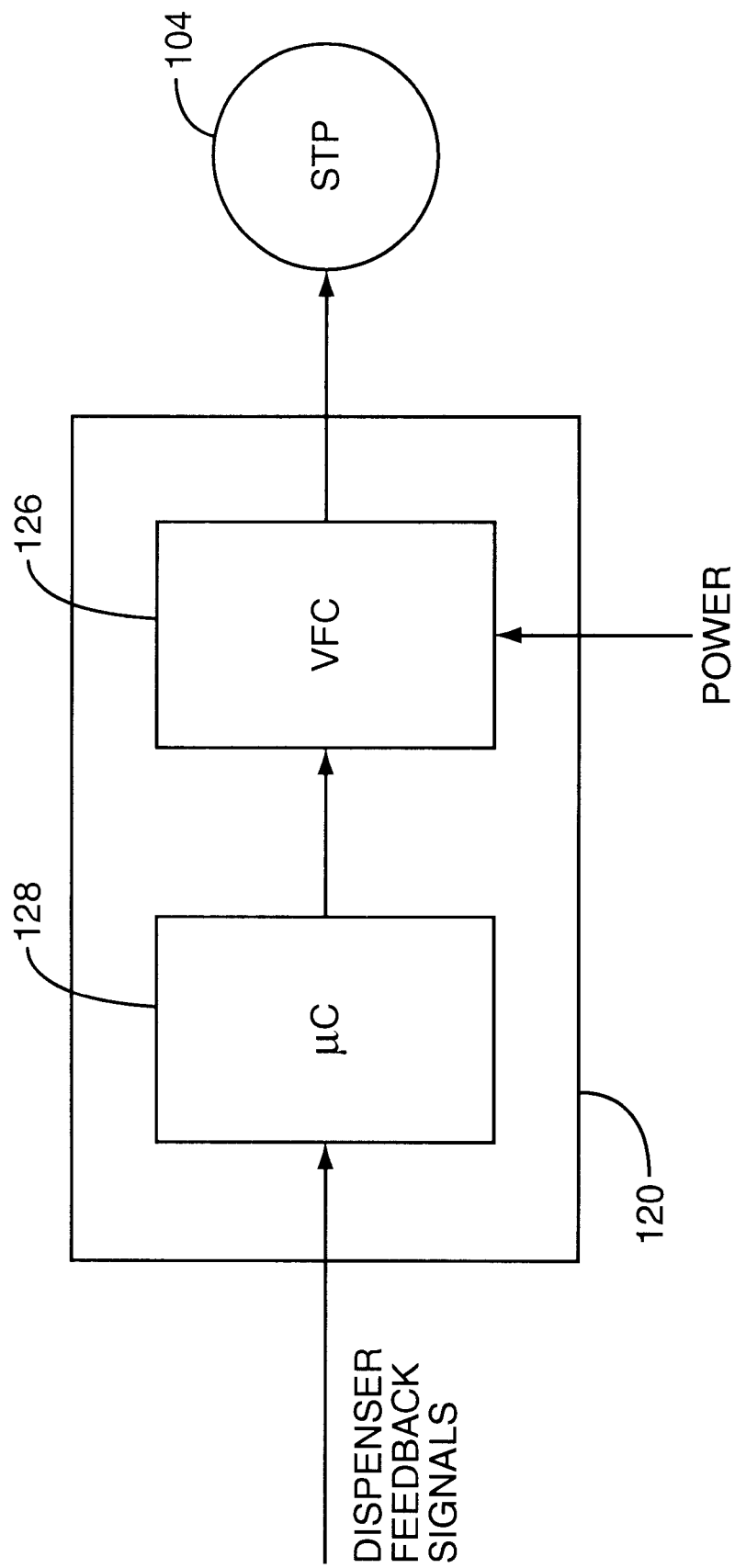
FIG. 4 is a schematic diagram of an alternative embodiment of the pump control interface.

FIG. 4 depicts an alternate embodiment for PCI 120. Controller 128 receives dispenser feedback signals from one or more fuel dispensers, with the dispenser feedback signals being proportionate to the actual fuel discharge rates from the respective fuel dispensers 130. These proportionate signals may be either analog or digital, and may be multiplexed onto a multi-dropped communications loop connecting all associated fuel dispensers 130 with the PCI 120, or may be wired in discretely per fuel dispenser 130. Using a proportionate control signal provides significant control flexibility. For example, controller 128 may simply operate VFC 126 such that it provides a default speed control output to STP 104 unless one or more dispenser feedback signals indicate low flow conditions that fall below a critical threshold. In some embodiments, this threshold may be programmable and allow the station operator to select a minimum acceptable fuel discharge rate. Thus, a given station operator may elect to forego any pumping rate adjustments until the fuel discharge rate from any active fuel dispenser 130 falls below this minimum threshold. Further, proportional dispenser feedback signals allow the fuel dispensing system 100 to operate STP 104 very efficiently.

Unlike fuel dispensing systems employing constant pressure pumping systems as previously discussed, the fuel dispensing system 100 of the present invention adjusts pumping rates based on true closed loop control, wherein the actual fuel discharge rates from the individual fuel dispensers 130 may be used to derive the control inputs. For example, in a prior art constant pressure pump system, the fuel delivery pump is typically configured to maintain a pressure adequate to ensure that all installed fuel dispensers can individually achieve the minimum desired fuel discharge rate. Actually, the default fuel delivery pressure may be well in excess of the actual minimum pressure required for fuel dispensers closest to the constant pressure pump, so as to ensure adequate pressure (flow) for those fuel dispensers furthest from the constant pressure pump. In the system of the present invention, the STP 104 may be operated at a different effective pressure (e.g., pumping rate) for each installed fuel dispenser 130. This allows the fuel dispensing system 100 to minimize pump wear and energy usage.

Figure 5:
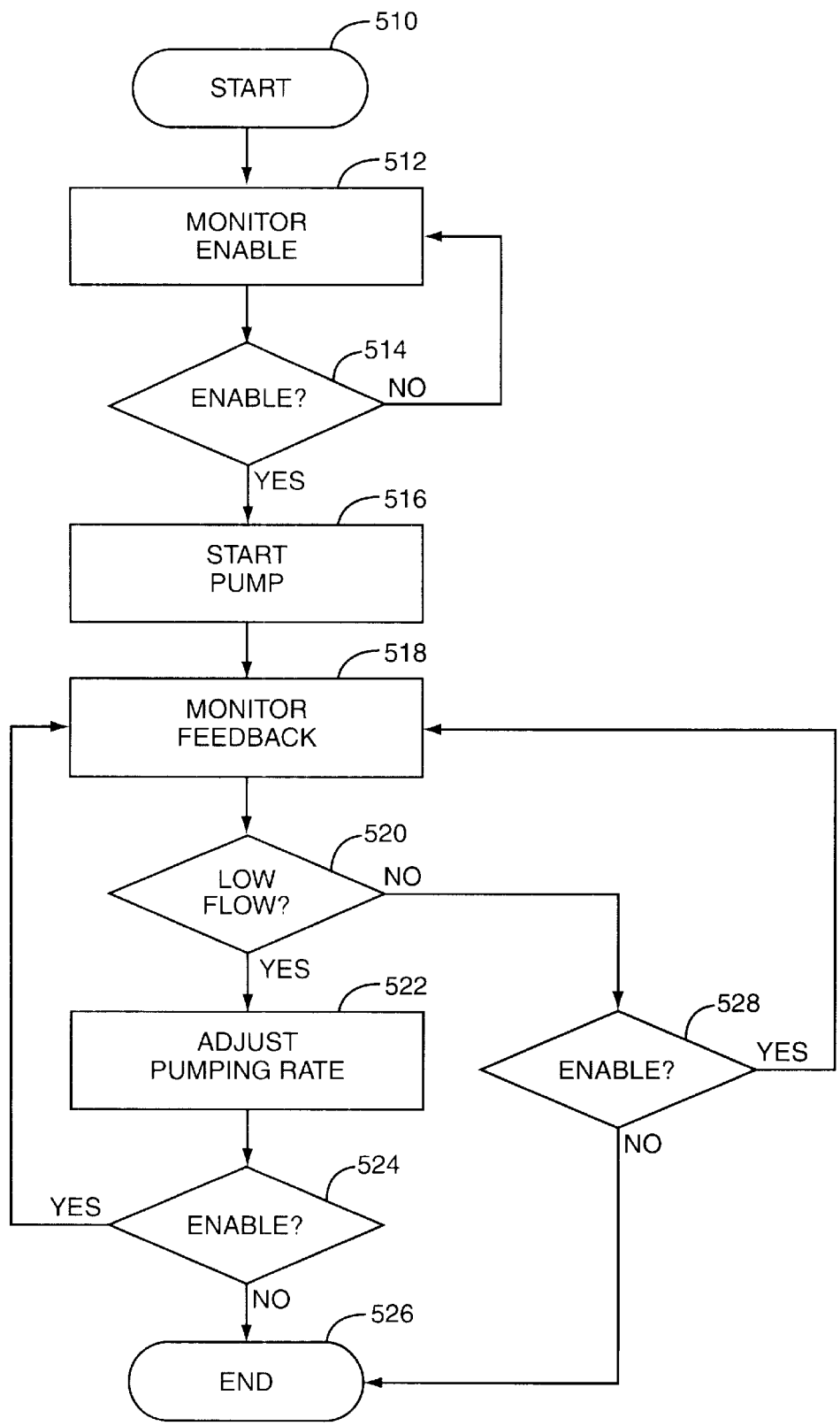
FIG. 5 is a flowchart of operation of the present invention.

FIG. 5 illustrates a logic flow diagram that may be implemented by the PCI 120 based on proportional dispenser feedback signals. Operation begins (510) with the PCI 120 monitoring its pump enable input signals (512). If no fuel dispensers 130 are active, PCI 120 remains in this monitoring state with the STP 104 off or in standby. Once one or more fuel dispensers 130 are activated (yes, 514), PCI 120 starts STP 104 (516). As noted, PCI 120 may start STP 104 at a default pumping rate, or may gradually ramp the pumping rate of STP 104 upwards until all active fuel dispensers 130 achieve the required fuel discharge rate as indicated by their respective dispenser feedback signals—this startup logic is not explicitly shown in FIG. 5. Once STP 104 is started, PCI 120 monitors the dispenser feedback signals (518) to determine whether any dispenser feedback signals indicate a low flow condition. If so (yes, 520), PCI 120 increases the pumping rate of STP 104 (522). If there are still active fuel dispensers 130 (yes, 524), operation returns to dispenser feedback signal monitoring (518). If no fuel dispensers 130 remain active (no, 524), operation is terminated and PCI 120 returns STP 104 to its off or standby state. If no active fuel dispensers 130 indicate a low flow condition at a given pumping rate (no, 520), PCI 120 checks to ensure that at least one fuel dispenser 130 is still active (yes, 528) and returns to monitoring the dispenser feedback signals (518). PCI 120 exits its dispenser feedback signal monitoring and pump rate adjustment loop at any point where no fuel dispensers 130 are active (no, 528) and the process ends (526).

Of course, pumping rate adjustment based on proportionate dispenser feedback signals may use any number of well-known control algorithms. For example, PCI 120 may process all active dispenser feedback signals to determine which fuel dispenser 130 is experiencing the worst-case low flow condition and tailor its speed control output accordingly. Speed control may represent simple proportional adjustments in direct response to changes in the worst-case dispenser feedback signal, or more sophisticated techniques, such as proportional-integral-derivative (PID) control, may be used to produce smoother speed control for STP 104.

Much flexibility exists regarding pumping rate control and depends, in part, on how the active fuel dispensers 130 generate their dispenser feedback signal. For example, in some embodiments, the dispenser feedback signal may be a simple binary signal indicating that the actual discharge rate is above or below the nominal or desired fuel discharge rate for that fuel dispenser 130—in some embodiments, there may be reason to maintain a different nominal fuel discharge rate for one or more fuel dispensers 130. With a binary dispenser feedback signal, the fuel dispenser 130 may assert the signal only if the discharge rate is below the nominal or desired rate (by some defined tolerance) and it can achieve no further increases in fuel flow rate based on adjusting its flow control device 138. In this manner, the dispenser feedback signal indicates that the pumping rate must be increased to get any further increases in fuel discharge rates from the affected fuel dispenser 130. Note that the binary signal may be a voltage- or current-mode discrete signal or may be a simple digital value representing the "low/not low" discharge condition.

Proportionate signaling represents a more flexible, albeit more complicated, approach to dispenser feedback signaling. With proportionate signaling (either analog or digital), the dispenser feedback signal may indicate either the absolute value of the fuel discharge rate from a given fuel dispenser 130, or may indicate the difference between the nominal fuel discharge rate and the actual fuel discharge rate for the fuel dispenser 130. In either case, the fuel dispenser 130, the PCI 120, or both, may apply filtering to smooth the proportionate feedback signal. The fuel dispensers 130 may generate proportionate feedback signals based on defined tolerances, such that small deviations between the actual fuel discharge rate and the nominal fuel discharge rate produce no proportionate output. This may help avoid attempts to adjust flow rate that are within the measurement or control tolerances of the overall fuel dispensing system 100.

Pumping rate control also incorporates margin or tolerance considerations. For example, assume that the worst-case dispenser feedback signal indicates a fuel discharge rate that is 10 percent below the nominal fuel discharge rate. Rather than PCI 120 producing a control output change resulting in an effective 10 percent flow increase for the affected fuel dispenser 130, the control algorithms adjust the pumping rate of STP 104 above the minimum increase required to allow the worst-case fuel dispenser 130 to achieve the nominal fuel discharge rate. In this manner, even the worst-case fuel dispenser 130 can use its flow control device 138 to provide final, more precise regulation of its fuel discharge rate at the nominal value. That is to say, PCI 120 sets the pumping rate of STP 104 somewhat above the absolute minimum rate necessary to achieve the nominal fuel discharge rate at all active fuel dispensers 130.

Another feature of the present invention results from reduced calibration requirements for the fuel dispensing system 100. Because the dispenser feedback signals are derived from the actual fuel discharge rate measured by each active fuel dispenser 130 using flow sensor 136, the fuel dispensing system may be configured to automatically "learn" different pumping rates associated with the fuel dispensers 130 at a particular installation. Prior-art systems have to be calibrated and verified to ensure that a given pump outlet pressure or fixed pumping rate actually results in the desired fuel discharge rate from each fuel dispenser 130 (or combination of fuel dispensers 130). Conversely, by closing the control loop based on actual dispenser fuel discharge rates, the system 100 of the present invention can automatically achieve the desired fuel discharge rate (or rates) for all active fuel dispensers 130. Moreover, the system 100 can do so with greater efficiency and accuracy than possible in past approaches. Basing much of its control and monitoring on equipment already included in conventional fuel dispensing systems represents another feature to the approach of the present invention.

The present invention provides fuel source pumping control based on dispenser feedback signals. These signals may be analog or digital, discrete or proportional. The dispenser feedback signals may comprise a portion of a bus interconnecting the fuel dispensers 130, site controller 110, and PCI 120, or may be individually routed, directly or indirectly, to the PCI 120. The PCI 120 may itself represent varying levels of complexity. In its simplest embodiment, the PCI 120 may simply be a motor control interface responsive to dispenser feedback signals from fuel dispensers 130. While this PCI configuration is not shown in the accompanying illustrations, it is well within the scope of the present invention. PCI 120 includes at least minimal processing logic allowing it to generate the appropriate speed control signal for STP 104 based on processing the dispenser feedback signals.

Pumping rate control is disclosed herein in the context of providing a variable frequency motor drive signal to an STP 104. While representative of a common pump speed control approach, the discussion herein is merely exemplary. The present invention may be practiced with a variety of pumps and pump motor types. These different types of pumps (and motors) may require different pumping rate control schemes. It should be understood that all such pumping rate control variations embody the concept of using fuel dispenser feedback signals to vary the pumping rate of fuel delivered to the fuel dispenser, and are within the scope of the present invention.

Indeed, the foregoing specification describes various approaches for practicing the present invention in exemplary fuel dispensing systems, yet these represent only exemplary approaches and any variation on the basic control approach is considered within the scope and spirit of the present invention. The present embodiments are, therefore, to be considered in all respects as illustrative and not restrictive, and all changes coming within the meaning and equivalency range of the appended claims are intended to be embraced therein.

What is claimed is:

1. A method of dispensing fuel, said method comprising:
    monitoring a discharge rate of said fuel dispensed from a fuel dispenser;
    adjusting a flow control device in said fuel dispenser to minimize a difference between said discharge rate and a desired rate;
    generating a dispenser feedback signal at said fuel dispenser based in part on said discharge rate;
    controlling a pumping rate of one or more pumps pumping said fuel to said fuel dispenser based in part on said dispenser feedback signal; and
    said fuel dispenser asserting said dispenser feedback signal when said discharge rate is less than said desired rate and said flow control device is at a maximum flow setting.

2. The method of claim 1, wherein said flow control device is a proportional flow control valve.

3. The method of claim 1, further comprising increasing said pumping rate of said one or more pumps by a defined amount when said dispenser feedback signal is asserted.

4. The method of claim 3, wherein said increasing said pumping rate of said one or more pumps by a defined amount when said dispenser feedback signal is asserted comprises periodically increasing said pumping rate by a defined amount while said dispenser feedback signal remains asserted or until a maximum pumping rate is reached.

5. The method of claim 1, wherein said generating a dispenser feedback signal at said fuel dispenser based in part on said discharge rate comprises generating a dispenser feedback signal that indicates a difference between said desired rate and said discharge rate.

6. The method of claim 5, wherein said controlling a pumping rate of one or more pumps pumping said fuel to said fuel dispenser based in part on said dispenser feedback signal comprises increasing said pumping rate proportionately with said dispenser feedback signal when said dispenser feedback signal indicates that said discharge rate is less than said desired rate.

7. The method of claim 1, wherein said generating a dispenser feedback signal at said fuel dispenser based in part on said discharge rate comprises generating a dispenser feedback signal that indicates said discharge rate of said fuel dispensed from said fuel dispenser.

8. The method of claim 7, wherein said controlling a pumping rate of one or more pumps pumping said fuel to said fuel dispenser based in part on said dispenser feedback signal comprises controlling said pumping rate proportionately with said dispenser feedback signal.

9. The method of claim 8, wherein said controlling said pumping rate proportionately with said dispenser feedback signal comprises selecting a default pumping rate and increasing said default pumping rate proportionate with said dispenser feedback signal only if said discharge rate is less than said desired rate.

10. A method of dispensing fuel, said method comprising:
   monitoring a discharge rate of said fuel dispensed from a fuel dispenser;
   adjusting a flow control device in said fuel dispenser to minimize a difference between said discharge rate and a desired rate;
   generating a dispenser feedback signal at said fuel dispenser based in part on said discharge rate;
   controlling a pumping rate of one or more pumps pumping said fuel to said fuel dispenser based in part on said dispenser feedback signal; and
   said fuel dispenser asserting said dispenser feedback signal when said discharge rate is less than said desired rate and a nozzle is at a maximum flow setting.

11. The method of claim 10, further comprising increasing said pumping rate of said one or more pumps by a defined amount when said dispenser feedback signal is asserted.

12. The method of claim 11, wherein said increasing said pumping rate of said one or more pumps by a defined amount when said dispenser feedback signal is asserted comprises periodically increasing said pumping rate by a defined amount while said dispenser feedback signal remains asserted or until a maximum pumping rate is reached.

13. A method of controlling a fuel dispensing system, said method comprising:
   pumping fuel from one or more fuel sources to one or more active fuel dispensers;
   monitoring a fuel discharge rate at each of said active fuel dispensers;
   adjusting a flow control device at each of said active fuel dispensers to maintain said fuel discharge rate substantially equal to a nominal fuel discharge rate; and
   adjusting a pumping rate from said one or more fuel sources if said fuel discharge rate at one or more of said active fuel dispensers fails to substantially equal said nominal fuel discharge rate despite said adjusting said flow control devices.

14. The method of claim 13, wherein said adjusting a pumping rate from said one or more fuel sources if said fuel discharge rate at one or more of said active fuel dispensers fails to substantially equal said nominal fuel discharge rate despite said adjusting said flow control devices comprises increasing said pumping rate if said fuel discharge rate at one or more of said active fuel dispensers remains below said nominal fuel discharge rate despite said adjusting said flow control devices.

15. The method of claim 14, wherein each of said active fuel dispensers operating with a fuel discharge rate substantially equal to said nominal fuel discharge rate before said increase in said pumping rate adjusts its flow control device, if necessary, such that said fuel discharge rate remains substantially equal to said nominal fuel discharge rate after said increase in said pumping rate.

16. The method of claim 14, wherein said increasing said pumping rate if said fuel discharge rate at one or more of said active fuel dispensers remains below said nominal fuel discharge rate despite said adjusting said flow control devices comprises determining a pumping rate value that will allow all said active fuel dispensers to achieve said nominal fuel discharge rate and increasing said pumping rate based on said determined pumping rate value.

17. The method of claim 14, wherein said increasing said pumping rate if said fuel discharge rate at one or more of said active fuel dispensers remains below said nominal fuel discharge rate despite said adjusting said flow control devices comprises:
   increasing said pumping rate by a defined amount;
   waiting a defined period of time;
   determining if said fuel discharge rate at any of said active fuel dispensers remains below said nominal fuel discharge rate; and
   repeating said steps of increasing, waiting, and determining until all said active fuel dispensers achieve said nominal fuel discharge rate or a maximum pumping rate is reached.

18. A fuel dispensing system comprising:
   a fuel dispenser including:
      a flow rate sensor sensing a dispensing rate of fuel dispensed from a fuel discharge outlet of said fuel dispenser;
      a flow control device controlling said dispensing rate; and
      a dispenser controller adjusting said flow control device based on monitoring said flow rate sensor and generating a control signal based on monitoring said flow rate sensor; and
   a pumping system including:
      one or more pumps pumping said fuel to said fuel dispenser; and
      a pump controller controlling a pumping rate of said one or more pumps based in part on said control signal from said dispenser controller,
   wherein said dispenser controller generates said control signal proportionate to said dispensing rate and said pump controller increases said pumping rate if said control signal indicates said dispensing rate is less than a desired rate.

19. The fuel dispensing system of claim 18, wherein said dispenser controller adjusts said flow control device such that said dispensing rate nominally equals a desired rate for a given pumping rate.

20. The fuel dispensing system of claim 18, wherein said pump controller comprises:
   a control signal interface generating an interface output signal responsive to said control signal generated by said dispenser controller;
   a logic circuit determining a pumping rate control signal based in part on said interface output signal; and
   a variable frequency motor controller providing pump motor drive signals to said one or more pumps based on said pumping rate control signal.

21. The fuel dispensing system of claim 20, wherein said pump controller further comprises a memory associated with said logic circuit, said memory configurable to contain at least a default pumping rate value used by said logic circuit to determine an initial pumping rate control signal.

22. The fuel dispensing system of claim 18, wherein said dispenser controller generates said control signal as a binary signal asserted when said dispensing rate is less than a desired rate and said adjusting flow control device does not increase said dispensing rate to a value nominally equal to said desired rate.

23. The fuel dispensing system of claim 22, wherein said pump controller periodically increases said pumping rate while said control signal is asserted.

24. A fuel dispensing system comprising:
   a fuel dispenser including:
      a flow rate sensor sensing a dispensing rate of fuel dispensed from a fuel discharge outlet of said fuel dispenser;
      a flow control device controlling said dispensing rate; and
      a dispenser controller adjusting said flow control device based on monitoring said flow rate sensor and generating a control signal based on monitoring said flow rate sensor; and
   a pumping system including:
      one or more pumps pumping said fuel to said fuel dispenser; and
      a pump controller controlling a pumping rate of said one or more pumps based in part on said control signal from said dispenser controller,
   wherein said dispenser controller indicates, via said control signal, when said dispensing rate can not be increased to a desired rate based on said adjusting said flow control device.

25. The fuel dispensing system of claim 24, wherein said pump controller increases said pumping rate in response to said indication by said dispenser controller via said control signal.

26. A fuel dispensing system comprising:
   a fuel dispenser including:
      a flow rate sensor sensing a dispensing rate of fuel dispensed from a fuel discharge outlet of said fuel dispenser;
      a flow control device controlling said dispensing rate; and
      a dispenser controller adjusting said flow control device based on monitoring said flow rate sensor and generating a control signal based on monitoring said flow rate sensor; and
   a pumping system including:
      one or more pumps pumping said fuel to said fuel dispenser; and
      a pump controller controlling a pumping rate of said one or more pumps based in part on said control signal from said dispenser controller,
   wherein said dispenser controller generates said control signal when said discharge rate is less than said desired rate and a nozzle associated with said fuel dispenser is at a maximum flow setting.

27. A fuel dispensing system comprising:
   a fuel dispenser including:
      a flow rate sensor sensing a dispensing rate of fuel dispensed from a fuel discharge outlet of said fuel dispenser;
      a flow control device controlling said dispensing rate; and
      a dispenser controller adjusting said flow control device based on monitoring said flow rate sensor and generating a control signal based on monitoring said flow rate sensor; and
   a pumping system including:
      one or more pumps pumping said fuel to said fuel dispenser; and
      a pump controller controlling a pumping rate of said one or more pumps based in part on said control signal from said dispenser controller,
   wherein said dispenser controller generates said control signal when said discharge rate is less than said desired rate and said flow control device is at a maximum flow setting.

* * * * *